US011065548B2

(12) United States Patent
Trombetta et al.

(10) Patent No.: US 11,065,548 B2
(45) Date of Patent: Jul. 20, 2021

(54) STATISTICAL DRIVEN TOURNAMENTS

(71) Applicant: SONY INTERACTIVE ENTERTAINMENT LLC, San Mateo, CA (US)

(72) Inventors: Steven Trombetta, San Mateo, CA (US); Christopher Thielbar, San Francisco, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 0 days.

(21) Appl. No.: 15/908,722

(22) Filed: Feb. 28, 2018

(65) Prior Publication Data

US 2019/0262720 A1 Aug. 29, 2019

(51) Int. Cl.
| A63F 13/32 | (2014.01) |
| A63F 13/798 | (2014.01) |
| A63F 13/795 | (2014.01) |
| A63F 13/213 | (2014.01) |
| A63F 13/211 | (2014.01) |
| A63F 13/215 | (2014.01) |
| A63F 13/33 | (2014.01) |

(52) U.S. Cl.
CPC .......... *A63F 13/798* (2014.09); *A63F 13/211* (2014.09); *A63F 13/213* (2014.09); *A63F 13/215* (2014.09); *A63F 13/795* (2014.09); *A63F 13/32* (2014.09); *A63F 13/33* (2014.09)

(58) Field of Classification Search
CPC .... A63F 13/798; A63F 13/211; A63F 13/213; A63F 13/795; A63F 13/32; A63F 13/33

USPC ......................................................... 463/42
See application file for complete search history.

(56) References Cited

U.S. PATENT DOCUMENTS

| 6,415,317 B1 | 7/2002 | Yelon et al. |
| 7,499,475 B2 | 3/2009 | Kashiwagi et al. |

(Continued)

FOREIGN PATENT DOCUMENTS

| CN | 110201395 A | 9/2019 |
| CN | 110201399 A | 9/2019 |

(Continued)

OTHER PUBLICATIONS

PCT Application No. PCT/US2019/015120 International Search Report and Written Opinion dated Apr. 15, 2019.

(Continued)

*Primary Examiner* — Omkar A Deodhar
(74) *Attorney, Agent, or Firm* — Polsinelli LLP

(57) ABSTRACT

The subject disclosure relates to systems and methods for ranking video game players based on performance statistics recorded during game-play. In some aspects, a process of the subject technology can include operations for receiving a first set of game-play attributes including two or more game-play statistics for measuring a first player's performance relative to a first game and a second game, receiving a second set of game-play attributes including two or more game-play statistics for measuring a second player's performance relative to the first game and the second game, and automatically ranking the first player and the second player based on the first set of game-play attributes and the second set of game-play attributes. Systems and computer-readable media are also provided.

16 Claims, 4 Drawing Sheets

(56) References Cited

U.S. PATENT DOCUMENTS

| | | |
|---|---|---|
| 8,025,572 B2 | 9/2011 | Spanton et al. |
| 8,645,844 B1 | 2/2014 | Strobel et al. |
| 9,433,855 B1* | 9/2016 | Keeker .................. A63F 13/35 |
| 9,497,424 B2 | 11/2016 | Kosseifi et al. |
| 9,782,678 B2 | 10/2017 | Long et al. |
| 9,860,477 B2 | 1/2018 | Kummer et al. |
| 9,871,997 B2 | 1/2018 | Kosseifi et al. |
| 9,968,856 B1 | 5/2018 | Ninoles et al. |
| 10,277,813 B1 | 4/2019 | Thomas et al. |
| 10,471,360 B2 | 11/2019 | Trombetta |
| 10,751,623 B2 | 8/2020 | Trombetta |
| 10,765,938 B2 | 9/2020 | Trombetta |
| 10,765,957 B2 | 9/2020 | Trombetta |
| 10,792,576 B2 | 10/2020 | Trombetta |
| 10,792,577 B2 | 10/2020 | Trombetta |
| 10,814,228 B2 | 10/2020 | Trombetta |
| 10,818,142 B2 | 10/2020 | Trombetta |
| 10,953,322 B2 | 3/2021 | Trombetta |
| 10,953,335 B2 | 3/2021 | Thielbar |
| 2002/0034980 A1 | 3/2002 | Lemmons et al. |
| 2002/0107040 A1 | 8/2002 | Crandall et al. |
| 2003/0177347 A1 | 9/2003 | Schneier et al. |
| 2003/0220143 A1 | 11/2003 | Shteyn et al. |
| 2004/0266535 A1 | 12/2004 | Reeves |
| 2006/0105827 A1* | 5/2006 | Metzger .................. A63F 13/10 463/9 |
| 2006/0247060 A1 | 11/2006 | Hanson et al. |
| 2007/0021058 A1 | 1/2007 | Aresneau et al. |
| 2007/0070914 A1 | 3/2007 | Abigail |
| 2007/0117635 A1 | 5/2007 | Spanton et al. |
| 2007/0248261 A1 | 10/2007 | Zhou et al. |
| 2008/0079752 A1 | 4/2008 | Gates et al. |
| 2008/0113815 A1* | 5/2008 | Weingardt .......... G07F 17/3276 463/42 |
| 2008/0200254 A1 | 8/2008 | Cayce et al. |
| 2009/0208181 A1 | 8/2009 | Cottrell |
| 2009/0225828 A1 | 9/2009 | Perlman et al. |
| 2010/0099330 A1 | 4/2010 | Digiovanni |
| 2010/0100512 A1 | 4/2010 | Brodin et al. |
| 2010/0240443 A1 | 9/2010 | Baerlocher et al. |
| 2011/0207523 A1 | 8/2011 | Filipour et al. |
| 2011/0263332 A1 | 10/2011 | Mizrachi |
| 2011/0263333 A1 | 10/2011 | Dokei et al. |
| 2012/0093481 A1 | 4/2012 | McDowell et al. |
| 2012/0283017 A1 | 11/2012 | Ahiska et al. |
| 2013/0002949 A1 | 1/2013 | Raveendran et al. |
| 2013/0007013 A1* | 1/2013 | Geisner .................. A63F 13/12 707/748 |
| 2013/0083173 A1 | 4/2013 | Geisner et al. |
| 2013/0123019 A1 | 5/2013 | Sullivan et al. |
| 2013/0254680 A1 | 9/2013 | Buhr et al. |
| 2013/0296051 A1 | 11/2013 | Gault et al. |
| 2014/0004951 A1 | 1/2014 | Kern et al. |
| 2014/0113718 A1 | 4/2014 | Norman et al. |
| 2014/0142921 A1* | 5/2014 | Gleadall ............. G06F 17/2881 704/9 |
| 2014/0171039 A1 | 6/2014 | Bjontegard |
| 2014/0171182 A1 | 6/2014 | Versaci |
| 2014/0179440 A1* | 6/2014 | Perry .................... A63F 13/803 463/42 |
| 2014/0274307 A1 | 9/2014 | Gonzalez |
| 2014/0274370 A1 | 9/2014 | Shah |
| 2015/0005052 A1 | 1/2015 | Harrington et al. |
| 2015/0011283 A1 | 1/2015 | Sanford et al. |
| 2015/0024850 A1* | 1/2015 | Kokami .................. A63F 13/31 463/42 |
| 2015/0113548 A1 | 4/2015 | Stern et al. |
| 2015/0141140 A1 | 5/2015 | Lampe et al. |
| 2015/0248792 A1 | 9/2015 | Abovitz et al. |
| 2015/0281029 A1 | 10/2015 | Callahan et al. |
| 2015/0348373 A1* | 12/2015 | Weingardt .......... G07F 17/3258 463/32 |
| 2015/0375117 A1 | 12/2015 | Thompson et al. |
| 2016/0051895 A1* | 2/2016 | Hood ...................... A63F 13/35 463/29 |
| 2016/0253865 A1 | 9/2016 | Men et al. |
| 2016/0286244 A1 | 9/2016 | Chang et al. |
| 2016/0310843 A1 | 10/2016 | Webb |
| 2016/0373499 A1 | 12/2016 | Wagner et al. |
| 2017/0001111 A1 | 1/2017 | Willette et al. |
| 2017/0001112 A1 | 1/2017 | Gilmore et al. |
| 2017/0003740 A1 | 1/2017 | Verfaillie et al. |
| 2017/0006074 A1 | 1/2017 | Oates |
| 2017/0072324 A1 | 3/2017 | Navok et al. |
| 2017/0157512 A1 | 6/2017 | Long et al. |
| 2017/0270751 A1* | 9/2017 | Paradise ................ A63F 13/86 |
| 2017/0304724 A1 | 10/2017 | Cotter |
| 2017/0354875 A1 | 12/2017 | Marks et al. |
| 2017/0374402 A1 | 12/2017 | Pogorelik et al. |
| 2018/0077438 A1 | 3/2018 | Hensen et al. |
| 2018/0139257 A1 | 5/2018 | Ninoles et al. |
| 2018/0167656 A1 | 6/2018 | Ortiz et al. |
| 2018/0250598 A1* | 9/2018 | Trombetta .............. A63F 13/35 |
| 2018/0250600 A1 | 9/2018 | Trombetta |
| 2018/0367820 A1 | 12/2018 | Abulikemu |
| 2019/0262705 A1 | 8/2019 | Trombetta |
| 2019/0262706 A1 | 8/2019 | Trombetta |
| 2019/0262712 A1 | 8/2019 | Trombetta |
| 2019/0262713 A1 | 8/2019 | Trombetta |
| 2019/0262717 A1 | 8/2019 | Thielbar |
| 2019/0262723 A1 | 8/2019 | Trombetta |
| 2019/0262724 A1 | 8/2019 | Trombetta |
| 2019/0262727 A1 | 8/2019 | Trombetta |
| 2019/0266845 A1 | 8/2019 | Trombetta |
| 2020/0179812 A1 | 6/2020 | Trombetta et al. |
| 2020/0384364 A1 | 12/2020 | Trombetta |
| 2020/0398157 A1 | 12/2020 | Trombetta |
| 2020/0398169 A1 | 12/2020 | Trombetta |
| 2020/0406152 A1 | 12/2020 | Trombetta |
| 2021/0016190 A1 | 1/2021 | Trombetta |
| 2021/0043044 A1 | 2/2021 | Trombetta |
| 2021/0052982 A1 | 2/2021 | Trombetta |

FOREIGN PATENT DOCUMENTS

| | | |
|---|---|---|
| CN | 110201401 A | 9/2019 |
| CN | 110201402 A | 9/2019 |
| CN | 110201404 A | 9/2019 |
| CN | 110573221 A | 12/2019 |
| CN | 111971097 A | 11/2020 |
| CN | 112423854 A | 2/2021 |
| CN | 112423855 A | 2/2021 |
| CN | 112543669 A | 3/2021 |
| KR | 10-2020-0126975 | 11/2020 |
| KR | 10-2020-0127169 | 11/2020 |
| KR | 10-2020-0127172 | 11/2020 |
| KR | 10-2020-0127173 | 11/2020 |
| KR | 10-2020-0128523 | 11/2020 |
| KR | 10-2020-0135946 | 12/2020 |
| KR | 10-2020-0136894 | 12/2020 |
| WO | WO 2014/109435 | 7/2014 |
| WO | WO 2016/048204 | 3/2016 |
| WO | WO 2017/004433 | 1/2017 |
| WO | WO 2018/160274 | 9/2018 |
| WO | WO 2018/165191 | 9/2018 |
| WO | WO 2019/168614 | 9/2019 |
| WO | WO 2019/168615 | 9/2019 |
| WO | WO 2019/168619 | 9/2019 |
| WO | WO 2019/168620 | 9/2019 |
| WO | WO 2019/168630 | 9/2019 |
| WO | WO 2019/168631 | 9/2019 |
| WO | WO 2019/168636 | 9/2019 |
| WO | WO 2019/168637 | 9/2019 |
| WO | WO 2019/168638 | 9/2019 |
| WO | WO 2019/168646 | 9/2019 |

OTHER PUBLICATIONS

PCT Application No. PCT/US2019/015124 International Search Report and Written Opinion dated Apr. 15, 2019.

(56) References Cited

OTHER PUBLICATIONS

PCT Application No. PCT/US2019/016686 International Search Report and Written Opinion dated Apr. 10, 2019.
PCT Application No. PCT/US2019/016698 International Search Report and Written Opinion dated Apr. 11, 2019.
PCT Application No. PCT/US2019/016694 International Search Report and Written Opinion dated Apr. 15, 2019.
PCT Application No. PCT/US2019/017100 International Search Report and Written Opinion dated Apr. 17, 2019.
PCT Application No. PCT/US2018/013378 International Search Report and Written Opinion dated Mar. 8, 2018.
U.S. Appl. No. 15/450,602 Office Action dated Apr. 6, 2018.
U.S. Appl. No. 15/448,356 Office Action dated Jan. 8, 2019.
U.S. Appl. No. 15/450,602 Final Office Action dated Nov. 2, 2018.
U.S. Appl. No. 15/448,356 Final Office Action dated Aug. 31, 2018.
PCT Application No. PCT/US2018/021197 International Search Report and Written Opinion dated May 30, 2018.
PCT Application No. PCT/US2019/015275 International Search Report and Written Opinion dated Apr. 23, 2019.
U.S. Appl. No. 15/908,345 Office Action dated Jan. 10, 2020.
U.S. Appl. No. 16/681,477, Steven Trombetta, User-Driven Spectator Channel for Live Game Play in Multi-Player Games, filed Nov. 12, 2019.
U.S. Appl. No. 16/681,477 Office Action dated Apr. 16, 2020.
U.S. Appl. No. 15/908,569 Office Action dated Mar. 27, 2020.
U.S. Appl. No. 15/448,356 Final Office Action dated Aug. 16, 2019.
U.S. Appl. No. 15/908,712 Office Action dated Aug. 8, 2019.
PCT Application No. PCT/US2018/013378 International Preliminary Report on Patentability dated Sep. 3, 2019.
PCT Application No. PCT/US2019/016167 International Search Report and Written Opinion dated Aug. 26, 2019.
U.S. Appl. No. 15/908,438 Office Action dated Oct. 3, 2019.
U.S. Appl. No. 15/908,707 Final Office Action dated Nov. 18, 2019.
U.S. Appl. No. 15/448,356 Office Action dated Mar. 5, 2018.
U.S. Appl. No. 15/450,602, Steven Trombeta, User-Driven Spectator Channel for Live Game Play in Multi-Player Games, filed Mar. 6, 2017.
PCT/US18/21197, User-Driven Spectator Channel for Live Game Play in Multi-Player Games, Mar. 6, 2017.
U.S. Appl. No. 15/448,356 Office Action dated May 28, 2020.
U.S. Appl. No. 15/908,704 Final Office Action dated Jun. 12, 2020.
PCT/US19/17100, Online Tournament Integration, Feb. 7, 2019.
PCT/US19/15120, Statistical Driven Tournaments, Jan. 25, 2019.
PCT/US19/15124, Statistically Defined Game Channels, Jan. 25, 2019.
PCT/US19/15273, Integrating Commentary Content and Gameplay Content Over a Multi-User Platform, Jan. 25, 2019.
PCT/US19/15275, De-Interleaving Gameplay Data, Jan. 25, 2019.
PCT/US18/16180, Incentivizing Players to Engage in Competitive Gameplay, Jan. 31, 2019.
PCT/US19/16167, Player to Spectator Handoff and Other Spectator Controls, Jan. 31, 2019.
PCT/US19/16694, Scaled VR Engagement and Views in an E-Sports Event, Feb. 5, 2019.
PCT/US19/16686, Discovery and Detection of Events in Interactive Content, Feb. 5, 2019.
PCT/US19/16698, Creation of Winner Tournaments With Fandom Influence, Feb. 5, 2019.
U.S. Appl. No. 16/681,477 Final Office Action dated Nov. 30, 2020.
NAHL ranked #1 by The Junior Hockey News_North American Hockey League_NAHL.pdf, http://nahl.com/news/story.cfm?id=15090, Jul. 16, 2015 (Year: 2015).
PCT Application No. PCT/US2018/021197 International Preliminary Report on Patentability dated Sep. 10, 2020.
PCT Application No. PCT/US2019/015120 International Preliminary Report on Patentability dated Sep. 1, 2020.
PCT Application No. PCT/US2019/015273 International Preliminary Report on Patentability dated Sep. 1, 2020.
PCT Application No. PCT/US2019/015124 International Preliminary Report on Patentability dated Sep. 1, 2020.
PCT Application No. PCT/US2019/015275 International Preliminary Report on Patentability dated Sep. 1, 2020.
PCT Application No. PCT/US2019/016167 International Preliminary Report on Patentability dated Sep. 1, 2020.
PCT Application No. PCT/US2019/016180 International Preliminary Report on Patentability dated Sep. 1, 2020.
PCT Application No. PCT/US2019/016686 International Preliminary Report on Patentability dated Sep. 1, 2020.
PCT Application No. PCT/US2019/016698 International Preliminary Report on Patentability dated Sep. 1, 2020.
PCT Application No. PCT/US2019/016694 International Preliminary Report on Patentability dated Sep. 1, 2020.
PCT Application No. PCT/US2019/017100 International Preliminary Report on Patentability dated Sep. 1, 2020.
U.S. Appl. No. 15/448,356 Final Office Action dated Oct. 21, 2020.
Application No. 18763374.8, Extended European Search Report dated Dec. 14, 2020.
U.S. Appl. No. 17/080,551, Steven Trombetta, Statistically Defined Game Channels, filed Oct. 26, 2020.
U.S. Appl. No. 17/014,149, Steven Trombetta, Integrating Commentary Content and Gameplay Content Over a Multi-User Platform, filed Sep. 8, 2020.
U.S. Appl. No. 17/014,182, Steven Trombetta, De-Interleaving Gameplay Data, filed Sep. 8, 2020.
U.S. Appl. No. 17/000,841, Steven Trombetta, Incentivizing Players to Engage in Competitive Gameplay, filed Aug. 24, 2020.
U.S. Appl. No. 17/015,845, Steven Trombetta, Player to Spectator Handoff and Other Spectator Controls, filed Sep. 9, 2020.
U.S. Appl. No. 17/060,458, Steven Trombetta, Discovery and Detection of Events in Interactive Content, filed Oct. 1, 2020.
U.S. Appl. No. 17/080,580, Steven Trombetta, Creatioin of Winner Tournaments With Fandom Influence, filed Oct. 26, 2020.
U.S. Appl. No. 15/448,356, Steven Trombetta, System and Method for Managing Online Gaming League, filed Mar. 2, 2017.
PCT/US18/13378, System and Method for Managing Online Gaming League, Jan. 11, 2018.
U.S. Appl. No. 15/908,569, Chris Thielbar, Online Tournament Integration.
U.S. Appl. No. 15/908,635, Steven Trombetta, Statistically Defined Game Channels.
U.S. Appl. No. 15/908,531, Steven Trombetta, Integrating Commentary Content and Gameplay Content Over a Multi-User Platform.
U.S. Appl. No. 15/908,657, Steven Trombetta, De-Interleaving Gameplay Data.
U.S. Appl. No. 15/908,438, Steven Trombetta, Incentivizing Players to Engage in Competitive Gameplay.
U.S. Appl. No. 15/908,345, Steven Trombetta, Player to Spectator Handoff and Other Spectator Controls.
U.S. Appl. No. 15/908,704, Steven Trombetta, Scaled VR Engagement and Views in an E-Sports Event.
U.S. Appl. No. 15/908,712, Steven Trombetta, Discovery and Detection of Events in Interactive Content.
U.S. Appl. No. 15/908,707, Steven Trombetta, Creation of Winner Tournaments With Fandom Influence.
U.S. Appl. No. 17/207,679, Christopher Thielbar, Online Tournament Integration, filed Mar. 21, 2021.
U.S. Appl. No. 17/188,544 Steven Trombetta, Scaled VR Engagement and Views in an E-Sports Event, filed Mar. 1, 2021.
U.S. Appl. No. 15/448,356 Office Action dated Apr. 12, 2021.
U.S. Appl. No. 16/681,477 Office Action dated Mar. 19, 2021.

* cited by examiner

STATISTICAL DRIVEN TOURNAMENTS

BACKGROUND

1. Technical Field

Aspects of the subject technology relate to the creation and management of online gaming leagues, and in particular, to an online platform for automatically managing player rankings in asynchronous online gaming competition.

2. Description of the Related Art

Like any popular competitive activity, such as football, card games and board games, online games have a large following of fans that appreciate competitive games and highly skilled players. As with other games, such fans also enjoy structured competition amongst peers of comparable skill level. For example, by encouraging a competitive atmosphere amongst peers, fantasy sports leagues and competitions have become a widespread activity. While fantasy leagues for a variety of sports are now widely available, comparable leagues for online games are not readily available for non-professional players.

SUMMARY OF THE CLAIMED INVENTION

Embodiments of the claimed invention include methods and systems for managing an online gaming league and in particular, for performing player rankings across multiple game titles and game-play statistics. Such systems may include a network interface that is configured to receive a first set of game-play attributes comprising two or more game-play statistics for measuring a first player's performance relative to a first game and a second game, and a second set of game-play attributes comprising two or more game-play statistics for measuring a second player's performance relative to the first game and the second game. In some aspects, the discloses systems may further include processors that execute instructions stored in non-transitory memory to automatically rank the first player and the second player based on the first set of game-play attributes and the second set of game-play attributes.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
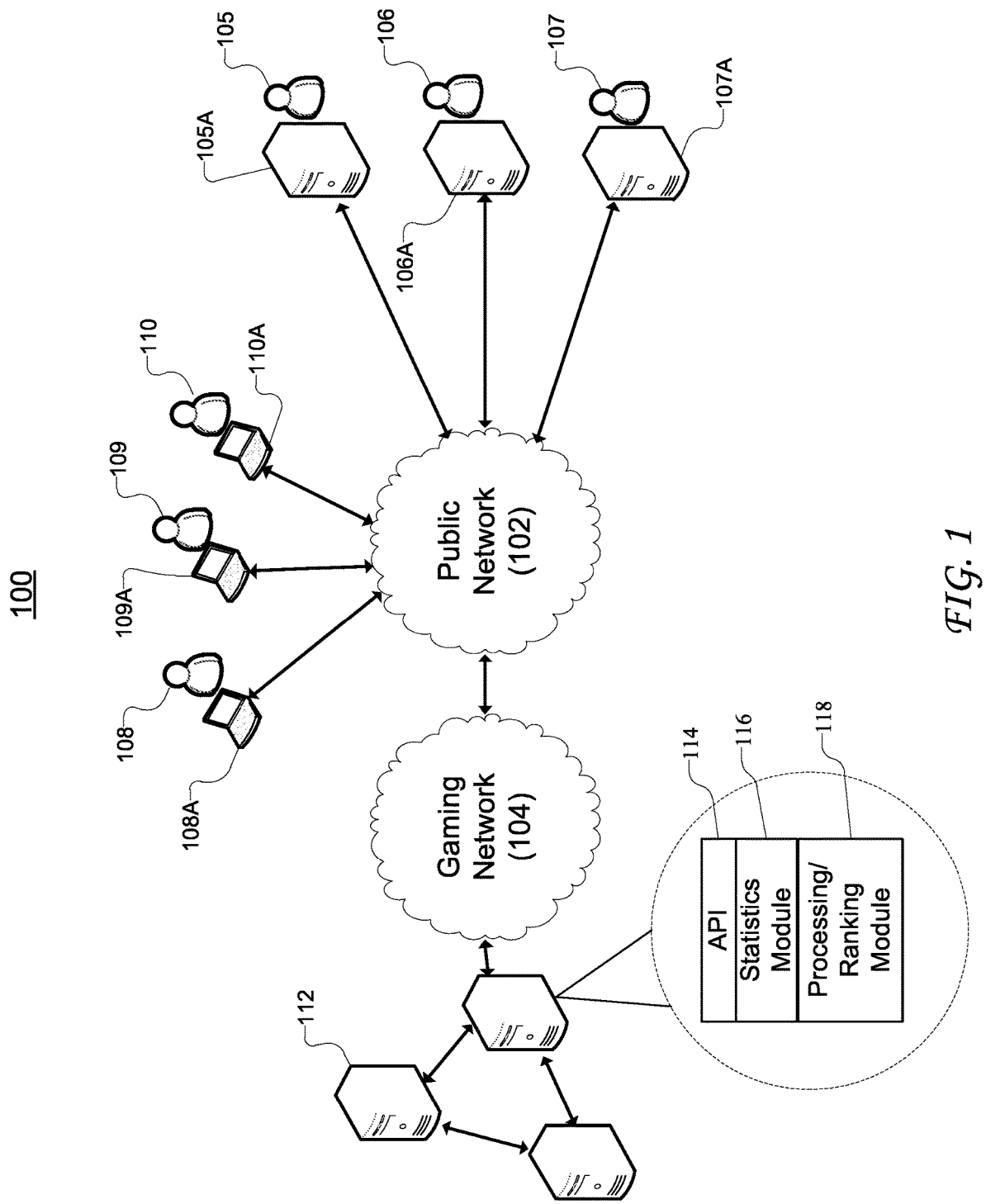
FIG. 1 illustrates an example of a network environment in which some aspects of the technology can be implemented.

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Competitive gaming, commonly referred to as electronic sports or "eSports," involve the play of video games in a competitive environment. Videogame competitions have existed for nearly as long as video games themselves. Early competitions were set up as tournament style matches between players focused on one particular game, often tied to a new product release. Eventually, competitive leagues and a constant stream of tournaments evolved to provide structure for the eSports community. Players now have the option of competing in a vast array of professional and amateur competitions held at physical locations or in virtual competitions conducted online. Leagues and content providers such as Major League Gaming (MLG), and Global StarCraft® League, provide opportunities for competition and to find information about competitive gaming. Until recently, participation in competitive gaming has demonstrated a gradual and steady pace in growth. However, competitive gaming is presently undergoing a rapid expansion in participation and interest.

Unlike fantasy gaming leagues, such as fantasy football, non-professional players of online games have limited ability to create and manage their own leagues in which players a similar skill level can compete. Additionally, online gamers lack access to a centralized platform that can be readily configured to perform player rankings, and that are based on player determined metrics and/or attributes across multiple game titles. Accordingly, it would be desirable to provide a gaming platform to flexibly permit the creation of leagues by both professional and non-professional players, as well as to manage the automatic scoring and ranking of players based on developer and/or player determined metrics (e.g., game-play statistics) that are selected for multiple different game titles.

The subject technology addresses the foregoing limitations by providing a gaming league platform that facilitates the creation and management of customized gaming leagues. In some aspects, the gaming league platform can be configured to receive various game-play attributes, for example, from a league organizer or player that specify various game characteristics and game-play statistics to be used for ranking competitive users/players. Specified game characteristics can include a game genre (e.g., fantasy), or a game format (e.g., first person shooter), etc. Game-play statistics can correspond with measurable statistical metrics pertaining to game play, such as a number of points scored, levels reached, or difficulty modes that have been unlocked. Game-play attributes, including game-play statistics and/or characteristics can be specified for a single game title, or for multiple titles. As such, league organizers or other competitive players can create custom tailored competitions in which player rankings are automatically performed based on player selected criteria across multiple game titles.

As also discussed in further detail below, game-performance attributes can also be used to specify conditions for the particular league in which the competition is conducted. For example, game performance attributes can be used to set a duration of the league's competition (i.e., a "season" length), a requisite skill level for inclusion in the league, and/or specific parameters for restricting participation to certain players, e.g., an access control list.

FIG. 1 illustrates an example of network environment 100 in which some aspects of the technology can be implemented. Environment 100 includes public network 102, which can include one or more private networks, such as, a local area network (LAN), a wide area network (WAN), or a network of public/private networks, such as the Internet. Public network 102 is communicatively coupled to gaming network 104 that represents a network of computing resources configured for implementing gaming league management system 112 of the subject technology.

Public network 102, and gaming network 104 provide player and developer access to league management system 112. As illustrated, players 108, 109, and 110 are permitted access to league management system 112 using respective client devices (e.g., 108A, 109A, and 110A). Although client devices 108A, 109A, and 110A, are depicted as personal computing devices, it is understood that the client devices can include various types of processor-based systems, including but not limited to: game consoles, smart phones, tablet computer systems, and the like. Example of hardware systems that can be used to implement the client device are discussed in further detail below with respect to FIG. 4. Similarly, developers (e.g., 105, 106 and 107), are permitted access to league management system via respective their computing systems (e.g., 105A, 106A, and 107A).

It is understood that a greater (or fewer) number of players and/or developers can be engaged with environment 100, without departing from the scope of the technology.

In practice, league management system 112 is configured to create and support tournament style competitions between various players and for multiple different game titles, for example, to facilitate player competition across game genres, such as, real-time strategy (RTS) games, adventure games, puzzle games, and the like.

Because the metrics that are used to evaluate player performance for a particular game can vary widely between game title and type, in some aspects, game developers are encouraged to provide an indication of the specific game-performance attributes that should be used to evaluate player performance for the developer's game.

By way of example, developers 105, 106, and/or 107 can be developers of different game titles, each of which is associated with a different genre. To facilitate league competition for their games, each of the developers can submit game-performance attributes to the league, e.g., using respective computing systems 105A, 106A, and 107A. In a similar manner, the creation of gaming leagues and corresponding league parameters can be managed at the player level, for example, by one or more of players 108, 109, and/or 110. That is, individual players or player collectives can provide specific game-performance attributes that they would like implemented to structure their own individualized league play.

Although game-performance attributes can include virtually any type of information that can be used in conjunction with the creation, execution, management, and/or promotion of a gaming league, in some aspects, game-performance attribute information can include game characteristics, including but not limited to one or more of: a "match type," "event information," and/or a player access list, etc. Game attributes information can also include game statistics, including but not limited to "high-level" player statistics such as: win/loss records, play time duration, levels achieved, points scored, and/or an ELO rating, etc. In some aspects, game statistics include "low-level" player statistics, including but not limited to: map-position information, map-path information, shots fired, time with rifle, time in kneel, time running, time to first fix, time to acquire a target, (e.g., "quick-draw" metrics), and/or measures of player/avatar health, etc.

The game-performance attributes, including game characteristics and game-play statistics can be received and recorded by league management system 112, for example, using an application programming interface (API), such as API 114. Subsequently, the game-performance attributes can be passed from API 114 to statistics module 116 for use in player analysis. In a similar manner, game-play statistics can be collected by API 114 and passed to statistics module 116. Depending on implementation, game-play statistics can be collected via active monitoring of an online game environment, or received from one or more external systems, for example, as part of a game performance data set that includes information describing individual player performance for one or more game titles and/or genre categories.

In some aspects, rankings can be automatically performed for multiple players based on player-specified game-attributes, including game characteristic and game-play statistic information. As discussed in further detail below with respect to FIG. 2, player provided game-attribute information can be used to compare and rank players across different game titles and genres, as well as for different statistical measures of player performance for a given game title.

In some aspects, rankings can be performed for a specified time period (e.g., the last 2 months of play), for a predetermined number of game plays (e.g., for 100 plays of a particular title), or for a "best-of" selection, e.g., by selecting the 3 best games played, or 5 best games out of 10, etc.

In other aspects, competition may endure for a predetermined time period, before rankings are performed. Once league competition has concluded, league management system 112 can use the game performance attributes, and game-play statistics to determine a ranking based on skill level for each player in a given league, e.g., using processing/ranking module 118. Determinations of skill level can vary depending upon the specified game performance attributes, and can vary between game titles, and/or game genres. By way of example, skill level for a given player can be based on one or more of: collected points, a number of wins/losses, total game time, achieve difficulty level, and/or a number of "kills," etc.

At the conclusion of league competition, designations of achievement can be provided based on the overall ranking of a player or group of players. For example, digital trophies or medals can be provided to the top-ranked player (or player team), and published on an associated player (or team) profile. By publishing player (or team) accomplishments, competition can be encouraged amongst users of the online gaming environment, either on a game-by-game basis, a league-by-league basis, or across various game genres.

In some aspects, players in a given league can be ranked into multiple categories or "tiers." By way of example, a "platinum" tier may be designated for the top 2% of players, a "gold" tier designated for the subsequent 20% of players, a "silver" tier designated for the next 28% of players, and a "bronze" tier designated for the last 32%, etc. Subsequent to the conclusion of league play, players may be either promoted (to a higher league tier), or demoted. By way of example, the top 10% of players in a tier may be moved up in tier ranking, e.g., from bronze to silver, and the bottom 10% in the tier may be moved down, e.g., from gold to silver tier.

The ranking of players within a given league also facilitates the ranking of various leagues into league hierarchies. For example, players categorized into the top tier of their respective league at the conclusion of a league competition may have the option of joining a higher league once competition resumes, i.e. in the subsequent "season." Similarly, low performing players may be demoted down the league hierarchy once competition resumes.

Figure 2:
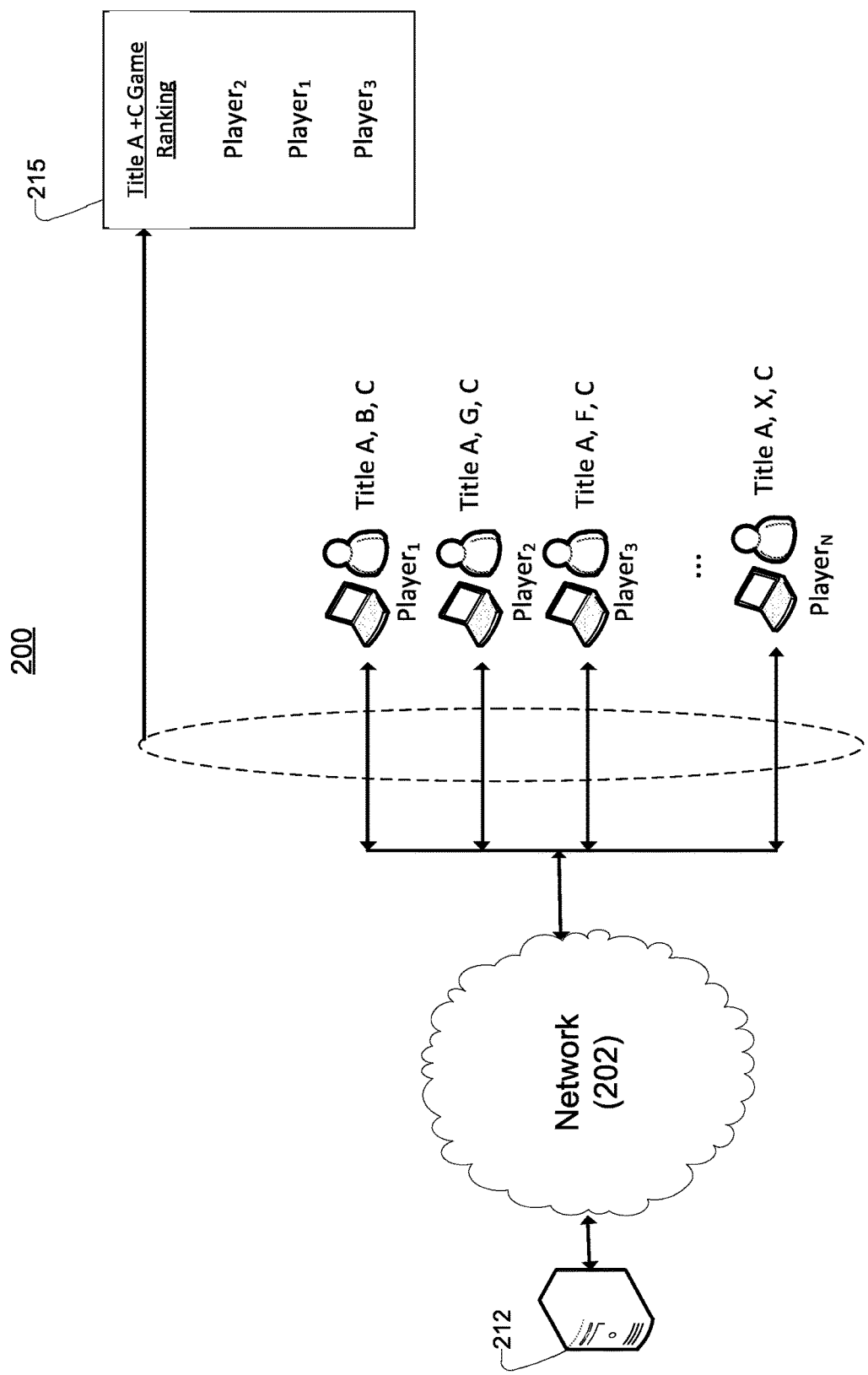
FIG. 2 conceptually illustrates the ranking of players across multiple game titles in an asynchronous competitive gaming environment.

FIG. 2 conceptually illustrates the ranking of players across multiple game titles in an asynchronous competitive game-play environment 200. Environment 200 includes ranking system 212 that is configured to receive game-play attribute information resulting from player engagement with various game titles, e.g., via network 202. In the example of FIG. 2, each of the players (e.g., Players$_{1-N}$) can be engaged with a different set of game titles. For example, Player$_1$ plays game titles A, B, and C, Player$_2$ plays titles A, G, C, and Player$_3$ plays titles A, F, C, etc.

In practice, player competition across one or more game titles can be asynchronous. That is, each player may play different game titles at a different time. However, user performance information with respect to each title (for each player) can be recorded, (e.g., by league management system 112, discussed above), and used to determine relative player rankings, e.g., using ranking system 212.

In some aspects, player rankings may be determined across multiple common game titles. As illustrated in FIG. 2, each of the players plays a slightly different mix of games, however, each player engages with titles A and C. As such, scoreboard 215 can include relative player rankings for common titles A and C.

Because rankings are determined based on game-play attributes collected from asynchronous user game-play, rankings for different user selected criteria can be determined on a post hoc basis. For example, Player$_1$ may initiate a competitive ranking with any number of other players by specifying any of one or more titles, one or more game characteristics, and/or one or more game-play statistics for which the ranking is to be performed. By offering the ability to collect asynchronous game-play attributes for each player, and for players to specify the metrics used for ranking competitive play, new player-defined leagues can be created for any number of player participants, and for any number of game titles.

However, it is understood that the ranking process of the disclosed technology is not limited to comparisons between different players for the same game. In some implementations, player rankings may be determined for similar metrics across different titles. By way of example, players may decide to see competitive rankings for kill rates in different first-person shooter games, or for lap-speeds in different racing games, etc.

Figure 3:
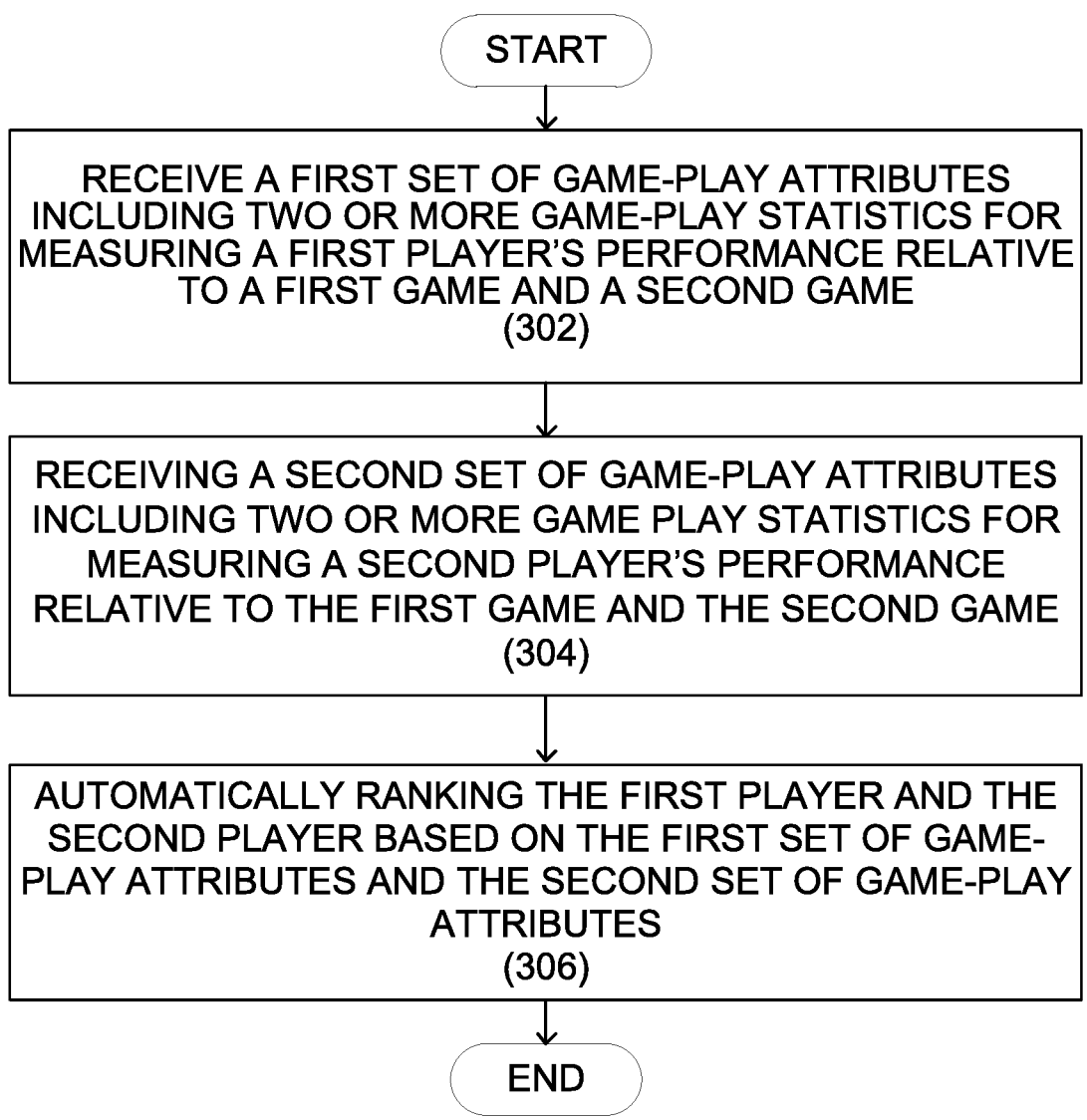
FIG. 3 illustrates steps of an example process for monitoring online game-play for a plurality of players, and raking users based on multi-title game play performance.

FIG. 3 illustrates steps of an example process 300 for monitoring online game-play for a plurality of players, and raking users based on multi-title game play performance. Process 300 begins with step 302, in which a first set of game-play attributes is received, e.g., by a ranking system, such as ranking system 212, discussed above. The game-play attributes can include two or more game-play statistics for measuring a first player's performance relative to a first game and a second game. That is, the first set of game-play attributes can include game characteristic information and/or game-play statistics for multiple titles that are played by the first player. As discussed above, the received game-play attributes can describe include information describing player interaction with virtually any number of game titles and for any game genre. Subsequently, in step 304, a second set of game-play attributes is received, including two or more game-play statistics for measuring a second player's performance relative to the first game and the second game.

In steps 302 and 304, game-play attributes for the first and second player can be received as a result of a monitoring process, for example, that involves recording/storing game-play statistics based on player performance in playing a video game for a specific game title. As discussed above, game-play statistics for a particular player can include information regarding any aspect of the player's performance or participation in an online game environment. For example, game-play statistics can include indications of a number of wins/losses incurred by the player, a difficulty level achieved by the player, a total time spent playing or engaged in the game environment, a number of points accumulated for various accomplishments/actions within the game environment, and/or an associated ELO score.

In step 306, an automatic ranking of the first player and the second player is performed based on the first set of game-play attributes and the second set of game-play attributes. The ranking can be based on a comparison of at least one of the game-play statistics corresponding with the first player's performance relative to the first game with at least one of the game-play statistics corresponding with the second player's performance relative to the first game, and a comparison of at least one of the game-play statistics corresponding with the first player's performance relative to the second game with at least one of the game-play statistics corresponding with the second player's performance relative to the second game As discussed above, the metrics used to perform the rankings can be determined by a player, league organizer, or virtually any party interested in creating a league for competitive online game-play. For example, league organizers can include individual players (e.g., players 108, 109, and 110) or game developers (e.g., developers 105, 106, and 107), as discussed above. However, it is understood that other entities may also provide game-play attributes necessary to organize league competition, without departing from the scope of the technology.

As discussed above, ranking can also be performed between various gaming leagues and/or cross entire game genres. For example, player ranking statistics can be automatically determined for an entire collection of game titles belonging to a similar genre, such as, "first person shooter" games, or "real-time strategy" games, etc.

Figure 4:
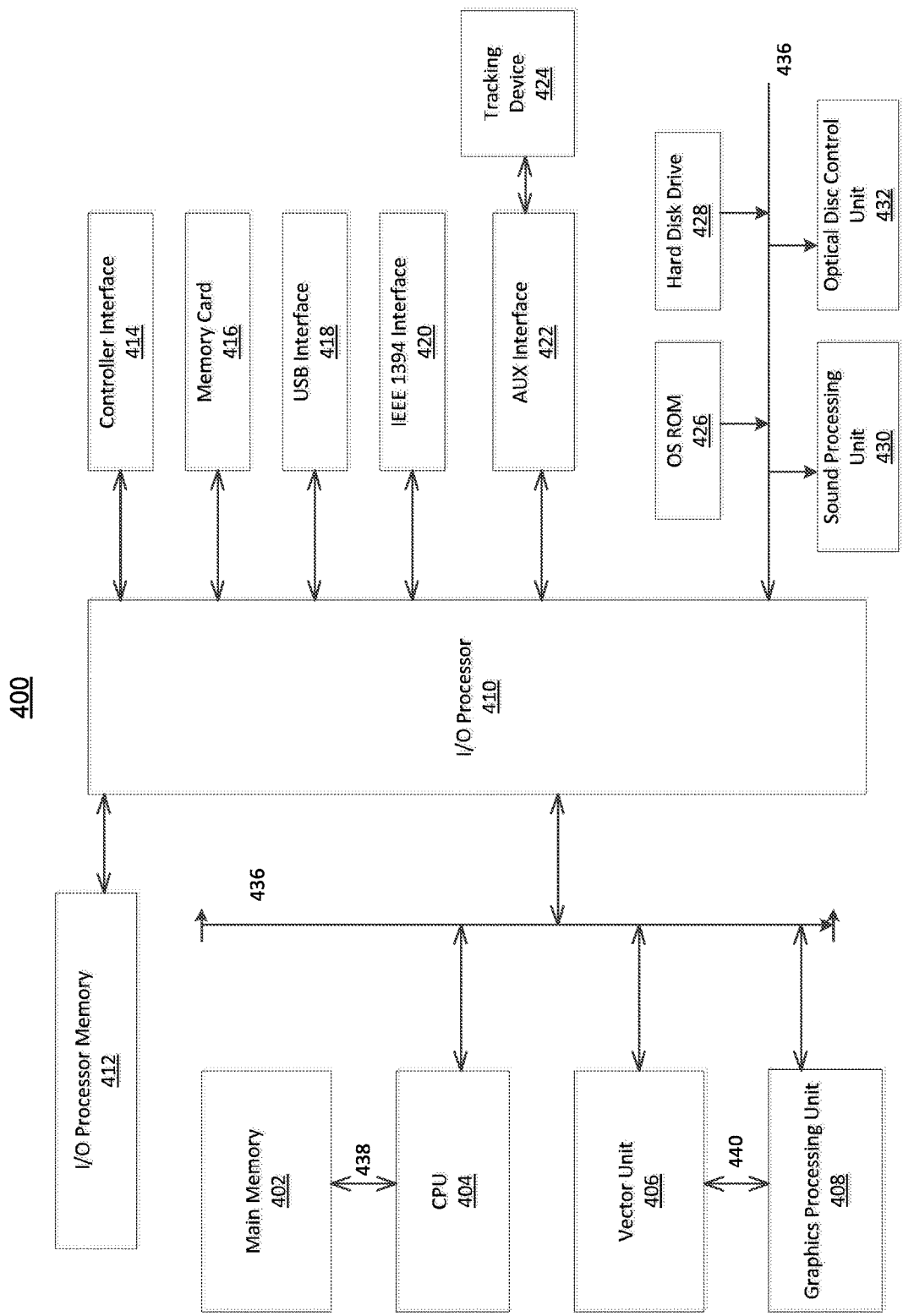
FIG. 4 illustrates an example of an electronic system with which some aspects of the subject technology can be implemented.

FIG. 4 is an exemplary user device 400. User device 400 (e.g., desktop, laptop, tablet, mobile device, console gaming system) is a device that the user can utilize to facilitate carrying out features of the present invention pertaining to the viewing of third party content.

The user device 400 may include various elements as illustrated in FIG. 4. It should be noted that the elements are exemplary and that other embodiments may incorporate more or less than the elements illustrated. With reference to FIG. 4, the user device 400 includes a main memory 402, a central processing unit (CPU) 404, at least one vector unit 406, a graphics processing unit 408, an input/output (I/O) processor 410, an I/O processor memory 412, a controller interface 414, a memory card 416, a Universal Serial Bus (USB) interface 418, and an IEEE 1394 interface 420, an auxiliary (AUX) interface 422 for connecting a tracking device 424, although other bus standards and interfaces may be utilized. The user device 400 further includes an operating system read-only memory (OS ROM) 426, a sound processing unit 428, an optical disc control unit 430, and a hard disc drive 432, which are connected via a bus 434 to the I/O processor 410. The user device 400 further includes at least one tracking device 424.

The tracking device 424 may be a camera, which includes eye-tracking capabilities. The camera may be integrated into or attached as a peripheral device to user device 400. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 424 may include a microphone integrated into or attached as a peripheral device to user device 400 that captures voice data. The microphone may conduct acoustic source localization and/or ambient noise suppression.

Alternatively, tracking device 424 may be the controller of the user device 400. The controller may use a combination of built-in accelerometers and infrared detection to sense its position in 3D space when pointed at the LEDs in a sensor nearby, attached to, or integrated into the console of the entertainment system. This design allows users to control functionalities of the user device 400 with physical gestures as well as button-presses. The controller connects to the user device 400 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user device 400 may be an electronic gaming console. Alternatively, the user device 400 may be implemented as a general-purpose computer, a set-top box, or a hand-held gaming device. Further, similar user devices may contain more or less operating components.

CPU 404, vector unit 406, graphics processing unit 408, and I/O processor 410 communicate via system bus 436.

Further, the CPU 404 communicates with the main memory 402 via a dedicated bus 438, while the vector unit 406 and the graphics processing unit 408 may communicate through a dedicated bus 440. The CPU 404 executes programs stored in the OS ROM 426 and the main memory 402. The main memory 402 may contain pre-stored programs and programs transferred through the I/O Processor 410 from a CD-ROM, DVD-ROM, or other optical disc (not shown) using the optical disc control unit 432. The I/O processor 410 primarily controls data exchanges between the various devices of the user device 400 including the CPU 404, the vector unit 406, the graphics processing unit 408, and the controller interface 414.

The graphics processing unit 408 executes graphics instructions received from the CPU 404 and the vector unit 406 to produce images for display on a display device (not shown). For example, the vector unit 406 may transform objects from three-dimensional coordinates to two-dimensional coordinates, and send the two-dimensional coordinates to the graphics processing unit 408. Furthermore, the sound processing unit 430 executes instructions to produce sound signals that are outputted to an audio device such as speakers (not shown).

A user of the user device 400 provides instructions via the controller interface 414 to the CPU 404. For example, the user may instruct the CPU 404 to store certain information on the memory card 416 or instruct the user device 400 to perform some specified action.

Other devices may be connected to the user device 400 via the USB interface 418, the IEEE 1394 interface 420, and the AUX interface 422. Specifically, a tracking device 424, including a camera or a sensor may be connected to the user device 400 via the AUX interface 422, while a controller may be connected via the USB interface 418.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A system for hosting a tournament gaming league, the system comprising:
    one or more processors;
    a network interface coupled to the one or more processors; and
    a non-transitory memory coupled to the one or more processors, the memory comprising instructions stored therein executable by the processors to perform operations comprising:
        actively monitoring a first set of game-play statistics measuring different gameplay attributes of a first player within a first game title, the first set of game-play statistics including at least one game-play statistic;
        actively monitoring a second set of game-play statistics measuring different gameplay attributes of a second player within a second game title, the second game title different from the first game title; and
        generating a cross-title ranking for the first player and for the second player based on an attribute measured by the at least one game-play statistic when the tournament gaming league ends, wherein generating the cross-title ranking includes comparing the at least one game-play statistic to a corresponding one of the second set of game-play statistics that measures a same type of the attribute.

2. The system of claim 1, wherein the at least one game-play statistic is associated with the first game title, and wherein generating the cross-title ranking for the first player and for the second player further comprises:
    comparing at least one of the first set of game-play statistics corresponding to the first game title with at least one of the second set of game-play statistics corresponding to the second game title.

3. The system of claim 1, wherein the processors further perform operations comprising:
    generating a display representing the cross-title ranking for the first player and for the second player; and
    providing the display to a client device associated with the first player.

4. The system of claim 1, wherein the first game title and the second game title belong to a same genre, and wherein the first set of game-play statistics and the second set of game-play statistics are automatically retrieved based on the first game title and the second game title belonging to the same genre.

5. The system of claim 1, wherein the second set of game-play statistics include at least one game-play statistic.

6. The system of claim 1, wherein the at least one game-play statistic is selected by the first player and is based on one or more criteria specified by the first player, and further comprising identifying the at least one game-play statistic based on the at least one game-play statistic meeting the specified criteria.

7. The system of claim 1, wherein the at least one game-play statistic is selected by the first player and is based on one or more conditions of a gaming league specified by the first player, and further comprising identifying the at least one game-play statistic based on the at least one game-play statistic meeting the conditions.

8. The system of claim 1, wherein the first set of game-play statistics and the second set of game-play statistics are determined based on one or more metrics.

9. The system of claim 8, wherein the metrics are defined on a post hoc basis and asynchronous with collection of the first set of statistics and the second set of statistics.

10. The system of claim 1, wherein the second player is selected by the first player.

11. A method for managing an online gaming league, the method comprising:
    actively monitoring a first set of game-play statistics measuring different gameplay attributes of a first player within a first game title, the first set of game-play statistics including at least one game-play statistic;
    actively monitoring a second set of game-play statistics measuring different gameplay attributes of a second player within a second game title, the second game title different from the first game title; and
    generating a cross-title ranking for the first player and for the second player based on an attribute measured by the at least one game-play statistic when the tournament gaming league ends, wherein generating the cross-title ranking includes comparing the at least one game-play statistic to a corresponding one of the second set of game-play statistics that measures a same type of the attribute.

12. The method of claim 11, wherein the at least one game-play statistic is associated with the first game title, and wherein generating the cross-title ranking for the first player and for the second player further comprises:
    comparing at least one of the first set of game-play statistics corresponding to the first game with at least one of the second set of game-play statistics corresponding to the second game.

13. The method of claim 11, further comprising executing further instructions via the processors to perform operations comprising:
    generating a display representing the cross-title ranking for the first player and for the second player; and
    providing the display to a client device associated with the first player.

14. The method of claim 11, wherein the first game title and the second game title belong to a same genre, and wherein the first set of game-play statistics and the second set of game-play statistics are automatically retrieved based on the first game title and the second game title belonging to the same genre.

15. The method of claim 11, wherein the second set of game-play statistics include at least one game-play statistic.

16. A non-transitory computer-readable storage medium, having embodied thereon a program executable by a processor to perform a method for managing an online gaming league, the method comprising:
    actively monitoring a first set of game-play statistics measuring different gameplay attributes of a first player within a first game title, the first set of game-play statistics including at least one game-play statistic;
    actively monitoring a second set of game-play statistics measuring different gameplay attributes of a second player within a second game title, the second game title different from the first game title; and
    generating a cross-title ranking for the first player and for the second player based on an attribute measured by the at least one game-play statistic when the tournament gaming league ends, wherein generating the cross-title ranking includes comparing the at least one game-play statistic to a corresponding one of the second set of game-play statistics that measures a same type of the attribute.

* * * * *